(12) United States Patent
Shulgin

(10) Patent No.: US 10,899,638 B2
(45) Date of Patent: Jan. 26, 2021

(54) METHOD AND SYSTEM FOR WATER ELECTROMAGNETIC ACTIVATION AND ACTIVE METALS GENERATION

(71) Applicant: Organocat, LLC, Louisville, KY (US)

(72) Inventor: Alexander I. Shulgin, Louisville, KY (US)

(73) Assignee: ORGANOCAT, LLC, Louisville, KY (US)

( * ) Notice: Subject to any disclaimer, the term of this patent is extended or adjusted under 35 U.S.C. 154(b) by 29 days.

(21) Appl. No.: 15/885,196

(22) Filed: Jan. 31, 2018

(65) Prior Publication Data

US 2019/0233312 A1    Aug. 1, 2019

(51) Int. Cl.
*C02F 1/48* (2006.01)
*C02F 1/00* (2006.01)
(Continued)

(52) U.S. Cl.
CPC .............. *C02F 1/485* (2013.01); *C02F 1/005* (2013.01); *C02F 1/463* (2013.01);
(Continued)

(58) Field of Classification Search
CPC ...... C02F 1/485; C02F 1/46104; C02F 1/463; C02F 2201/483; C02F 2201/4611;
(Continued)

(56) References Cited

U.S. PATENT DOCUMENTS

| 2,825,464 A | 3/1958 | Mack |
| 3,027,321 A | 3/1962 | Selm et al. |

(Continued)

FOREIGN PATENT DOCUMENTS

| CH | 538294 A | 6/1973 |
| CN | 102249390 A | 11/2011 |

(Continued)

OTHER PUBLICATIONS

European Patent Office, International Search Report and Written Opinion for PCT/US2019/015778 dated Apr. 1, 2019.

(Continued)

*Primary Examiner* — Claire A Norris
*Assistant Examiner* — Ekandra S. Miller-Cruz
(74) *Attorney, Agent, or Firm* — Middleton Reutlinger

(57) ABSTRACT

A system and method for electromagnetic activation or active metals generation is disclosed herein. This system may include: a cylindrical housing; a plurality of inductor coils connected to a three phase alternating current source, where inductor coils are positioned in an interior space between the cylindrical housing and an exterior face of a conduit; the conduit installed inside the cylindrical housing, where the conduit includes a dielectric section with a perforated baffle a mechanism to secure the conduit to the cylindrical housing, a tube for adding a chemically active agent into the conduit, a dielectric section with a lid and a gas valve positioned on top of the lid at an end of the conduit, and a plurality of metal particles occupying the internal volume of the conduit and maintained in a relative position with respect to the inductor coils.

30 Claims, 5 Drawing Sheets

(51) Int. Cl.
*C02F 1/463* (2006.01)
*C02F 1/461* (2006.01)
*C02F 1/465* (2006.01)
*C02F 1/467* (2006.01)

(52) U.S. Cl.
CPC .......... *C02F 1/46104* (2013.01); *C02F 1/484* (2013.01); *C02F 1/487* (2013.01); *C02F 1/465* (2013.01); *C02F 1/4672* (2013.01); *C02F 1/46114* (2013.01); *C02F 2201/4611* (2013.01); *C02F 2201/483* (2013.01)

(58) Field of Classification Search
CPC ...... C02F 1/484; C02F 1/46114; C02F 1/465; C02F 1/4672; C02F 1/487; C02F 1/48; C02F 1/705; C02F 1/005
USPC ........................................................ 210/222
See application file for complete search history.

(56) References Cited

U.S. PATENT DOCUMENTS

| | | | |
|---|---|---|---|
| 3,206,160 A * | 9/1965 | Bennett | F16K 31/0682 251/65 |
| 3,349,354 A | 10/1967 | Miyata | |
| 3,680,705 A | 8/1972 | Happ et al. | |
| 3,923,660 A | 12/1975 | Kottmeier | |
| 3,951,807 A | 4/1976 | Sanderson | |
| 4,157,963 A | 6/1979 | Jessop et al. | |
| 4,210,535 A | 7/1980 | Risk | |
| 4,216,092 A | 8/1980 | Shalhoob et al. | |
| 4,265,754 A | 5/1981 | Menold | |
| 4,265,755 A | 5/1981 | Zimmerman | |
| 4,289,621 A | 9/1981 | O'Meara, Jr. | |
| 4,338,178 A | 7/1982 | Efimov et al. | |
| 4,347,133 A | 8/1982 | Brigante | |
| 4,407,719 A * | 10/1983 | Van Gorp | C02F 1/485 210/222 |
| 4,417,984 A | 11/1983 | O'Meara, Jr. | |
| 4,427,544 A | 1/1984 | Roch | |
| 4,428,837 A | 1/1984 | Kronenberg | |
| 4,460,463 A * | 7/1984 | Yoshida | B03C 1/034 210/222 |
| 4,659,479 A | 4/1987 | Stickler et al. | |
| 4,678,554 A | 7/1987 | Oppitz | |
| 5,348,050 A | 9/1994 | Ashton | |
| 5,622,622 A * | 4/1997 | Johnson | A61L 2/02 210/192 |
| 6,022,479 A | 2/2000 | Smirnov | |
| 6,055,768 A | 5/2000 | Burkett | |
| 6,056,872 A | 5/2000 | Glass | |
| 6,165,339 A * | 12/2000 | Ibbott | C02F 1/48 204/554 |
| 6,214,182 B1 | 4/2001 | Ritter | |
| 6,217,773 B1 * | 4/2001 | Graham | B01D 61/025 210/651 |
| 6,564,508 B1 | 5/2003 | Buchan | |
| 6,576,127 B1 * | 6/2003 | Ohkawa | H05H 1/54 204/155 |
| 6,743,365 B1 * | 6/2004 | Marlowe | B01D 35/06 209/223.1 |
| 6,897,628 B2 | 5/2005 | Gunnerman et al. | |
| 6,942,807 B1 * | 9/2005 | Meng | C02F 1/34 210/202 |
| 7,887,708 B2 | 2/2011 | Chew | |
| 8,222,475 B2 | 7/2012 | Denton | |
| 8,431,009 B2 | 4/2013 | Morkovsky et al. | |
| 8,598,062 B2 * | 12/2013 | Berkowitz | B01J 20/02 422/211 |
| 8,703,757 B2 | 4/2014 | Sluijter et al. | |
| 8,889,075 B2 | 11/2014 | Tanaka et al. | |
| 9,078,393 B1 | 7/2015 | Polizotto | |
| 2001/0007312 A1 * | 7/2001 | Siddiqi | B03C 1/01 210/695 |
| 2006/0157416 A1 * | 7/2006 | Seidel | B01J 39/17 210/688 |
| 2013/0318866 A1 | 12/2013 | Gunderman, Jr. | |
| 2014/0353145 A1 * | 12/2014 | Jang | C02F 1/705 204/257 |

FOREIGN PATENT DOCUMENTS

| | | | | |
|---|---|---|---|---|
| CN | 102583689 A | | 7/2012 | |
| CN | 102249390 A | * | 10/2012 | ............... C02F 1/58 |
| CN | 102951705 A | | 3/2013 | |
| EP | 0074160 A1 | | 3/1983 | |
| EP | 0459540 A1 | | 12/1991 | |
| FR | 2580897 A1 | | 10/1986 | |
| KR | 20-0403363 Y1 | * | 8/2005 | ............... C02F 1/46 |
| WO | 0036902 | | 6/2000 | |
| WO | 2006006946 A1 | | 1/2006 | |

OTHER PUBLICATIONS

S Bang et al, "Removal of arsenic from water by zero-valent iron", Journal of Hazardous Materials, vol. 121, No. 1-3 Mar. 18, 2005, pp. 61-67, Amsterdam, NL.

Jedlicka, Jaroslav, et al.: Influence of Magnetic Field on Germination, Growth and Production of a Tomato, Mar. 28, 2014, Potravinarstvo Scientific Journal for Food Industry, vol. 8, 2014, No. 1, p. 150-154.

Yadollahpour Ali et al.: Application of Magnetic Water Technology in Farming and Agriculture Development: A Review of Recent Advances, a Review of Recent Advances. Current World Environment, Vo. 9(3), 695-703 (2014), http://dx.doi.org/10.12944/CWE.9.3.18, Web.

* cited by examiner

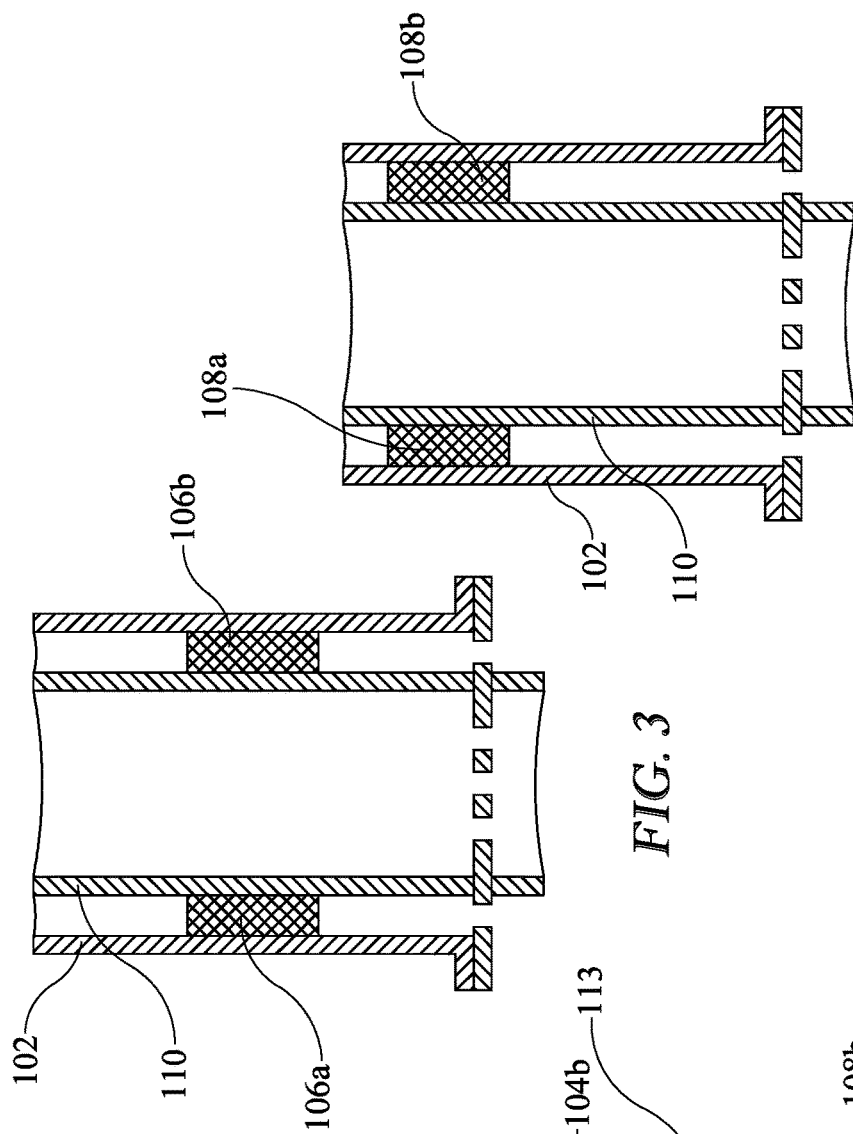
FIG. 3
FIG. 4
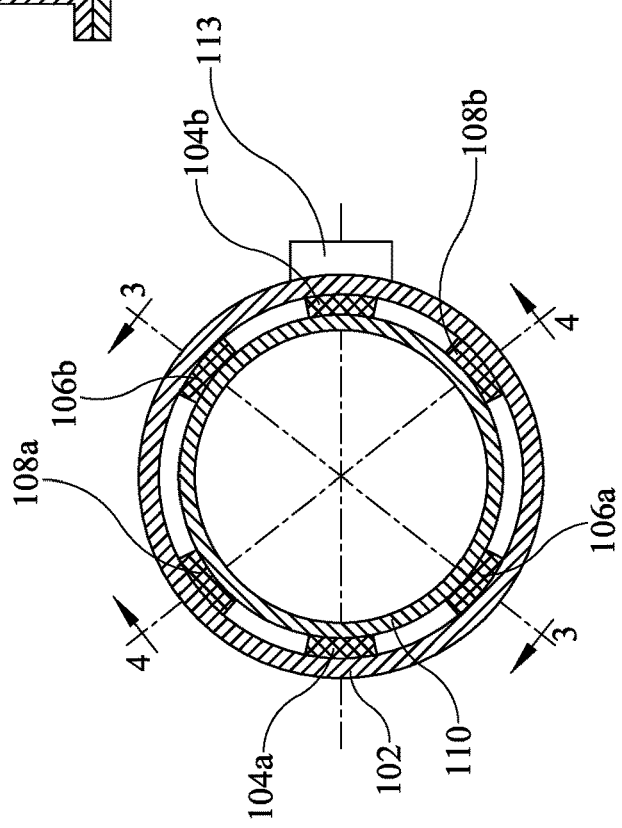
FIG. 2

METHOD AND SYSTEM FOR WATER ELECTROMAGNETIC ACTIVATION AND ACTIVE METALS GENERATION

BACKGROUND

Electromagnetic water treating methods and devices are known. These methods and devices may alter water structure, internal energy, and impurities through electromagnetic fields. Conventionally, fluid to be treated may pass through a primarily magnetic field provided by permanent magnets or electromagnetic coils. An example of a conventional methods and devices may include one or more permanent magnets disposed along a fluid carrying conduit. Another example of conventional methods and devices may also employ permanent magnets, but disposed them within the fluid stream itself. There exists a need in the art for simple, cost effective, uniform methods, systems, and devices for electromagnetic treatment of water and aqueous solutions; particularly for, although not limited to, industrial, agricultural and/or environmental uses.

SUMMARY

In one aspect, a method of electromagnetic activation of water or active metals generation is disclosed, the method including: pumping an aqueous solution through a conduit containing a plurality of metal pieces in a rotating and/or oscillating electromagnetic field, where the electromagnetic field is generated by a plurality of inductor coils; varying a speed of rotation and/or oscillation, where the inductor coils have a varying electric current frequency and electromagnetic induct winding currents are created in the metal pieces generating a vibrational movement; and adding a chemically active compound to the aqueous solution.

In some embodiments, the method further includes providing the plurality of inductor coils at varying offsetting vertical positions. In other embodiments, the method further includes at least two pairs of inductor coils at the varying offsetting vertical positions. In still other embodiments, at least three pairs of inductor coils are provided at varying offsetting positions relative to each other pair.

In some embodiments, the method further included energizing the inductor coils by three phase alternating current with a basic frequency of about 50 Hz to about 60 Hz. In other embodiments, the method further comprises energizing the inductor coils by three phase variable frequency alternating current. In some embodiments, the frequency of the rotating and oscillating electromagnetic field is set up for parametric resonance in the vibrational movement of the pieces of metal.

In some embodiments, the method further includes including a plurality of shapes and sizes of the metal pieces within the conduit. In some embodiments, the metal pieces are metal scrub or shavings from metal processing waste. In other embodiments, the metal pieces are transition metals. In still other embodiments, the metal pieces are iron. In still yet other embodiments, the metal pieces are Nano Iron or Zero Valent Iron powder.

In some embodiments, the chemically active compound is an oxidizing agent. In other embodiments, the chemically active compound is a flocculant or coagulant. In still other embodiments, the flocculant is a cationic, or an anionic or nonionic polymer. In still yet other embodiments, the coagulant is a fine clay, hydrated lime, zeolite, alkali, or acid.

In some embodiments, the electromagnetic field is three dimensional, resulting in multidimensional movement of the plurality of metal pieces. In other embodiments, the method further includes applying a variable frequency drive, wherein a frequency varied from about 4 to about 60 Hz.

In another aspect, a system for electromagnetic activation or active metals generation is disclosed, the system including: a cylindrical housing; a plurality of inductor coils directly connected to a three phase alternating current source positioned along an interior wall of the cylindrical housing; a conduit installed inside the cylindrical housing and inside of the plurality of inductor coils, where the conduit further includes a plurality of metal pieces occupying the internal volume of the conduit and where the plurality of metal pieces are positionally maintained within the area of the inductor coils.

In some embodiments, the inductor coils are positioned in a plurality of pairs, where a first coil is directly opposite of a second coil along an axis cutting through the cylindrical housing and conduit. In other embodiments, the pairs of inductor coils are positioned where a second pair is installed above and angled as compared to a first pair, such that the pairs are positioned along a spiral line. In still other embodiments, the pairs positioned along a spiral line create a rotating magnetic field. In some embodiments, the rotating magnetic field alters a dimension of at least one of the plurality of metal pieces.

In some embodiments, the metal pieces occupying the internal volume of the conduit may be a plurality of shapes. In other embodiments, the metal pieces occupying the internal volume of the conduit may be about 5-10 millimeters to about 30-40 millimeters in size.

In some embodiments, the metal pieces occupying the internal volume of the conduit may be Nano Iron or Zero Valent Iron powder. In other embodiments, the metal pieces occupying the internal volume of the conduit may be metal scrub or shavings from metal processing waste. In still other embodiments, the metal pieces occupying the internal volume of the conduit may be comprised of a transitional metal, preferably iron.

In yet another aspect, a system for electromagnetic activation or active metals generation is disclosed, where the system includes: a cylindrical housing; a plurality of inductor coils connected to a three phase alternating current source, where the inductor coils are positioned in an interior space between the cylindrical housing and an exterior face of a conduit; the conduit installed inside the cylindrical housing, where the conduit further includes: a dielectric section with a perforated baffle; a mechanism to secure the conduit to the cylindrical housing; a tube for adding a chemically active agent into the conduit; a dielectric section with a lid and a gas valve positioned on top of the lid at an end of the conduit; and a plurality of metal particles occupying the internal volume of the conduit and maintained in a relative position with respect to the inductor coils.

BRIEF DESCRIPTION OF FIGURES

Embodiments of the invention will be better understood and readily apparent to one of the ordinary skill in the art from the following written description and in conjunction with the drawings, in which:

FIG. 2 is a cross-sectional view taken along lines 2-2 of FIG. 1.

FIG. 3 is a cross-sectional view taken along lines 3-3 of FIG. 2

FIG. 4 is a cross-sectional view taken along lines 4-4 of FIG. 2

DETAILED DESCRIPTION

Figure 1:
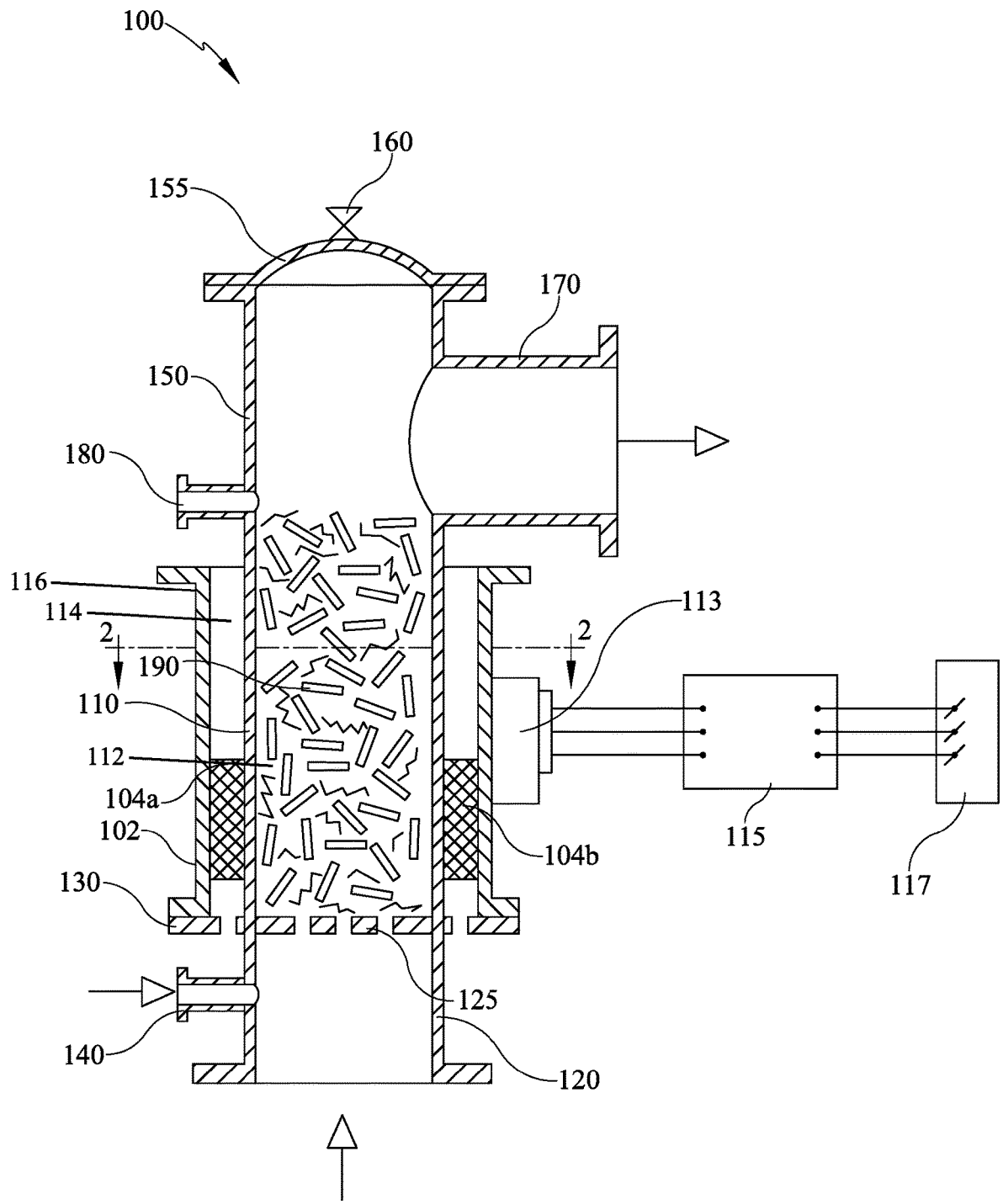
FIG. 1 is a cross-sectional view of an embodiment of the system described herein.

Referring now to FIG. 1, an exemplary embodiment of a system for water electromagnetic activation, active metal generation in reduction, oxidation, flotation, coagulation, and disinfection of aqueous solution. As illustrated in FIGS. 1 and 2, in various implementations the system may include an electromagnetic field generator 100 which includes a cylindrical housing or stator 102 with a plurality of inductor coils (or poles) 104a, 104b, 106a, 106b, 108a, 108b. The plurality of inductor coils (or poles) 104a, 104b, 106a, 106b, 108a, 108b may be positioned in an interior space 114 between the cylindrical housing or stator 102 and an exterior face 116 of the system 100. In some embodiments there may be as few as two inductor coils (or poles), while in other embodiments there may be three, six, or more inductor coils. For example, embodiments with six inductor coils may mimic an industrial three phase asynchronous motor stator with typical electrical connections between the poles and a three phase alternative current. Although FIG. 1 illustrates salient poles in the form of coils with surrounding wires, this is not to be understood as limiting as other induction mechanisms may be utilized which generate high-voltage pulses and/or magnetic fields from the power source. For example, in some embodiments, industrial asynchronous stators with smooth internal surfaces and wiring into the stator's slots may be used.

In some embodiments, as illustrated in FIG. 1, the plurality of inductor coils (or poles) 104a, 104b, 106a, 106b, 108a, 108b may be connected with a suitable terminal 113. This terminal 113 may be connected to a three phase alternating current source 117 directly, or in alternative embodiments, through a variable-frequency drive 115. As illustrated in FIG. 2, each inductor coil or pole 104a, 104b, 106a, 106b, 108a, 108b may be installed opposite one another. In some embodiments, each set of inductive coils 104a and 104b, 106a and 106b, 108a and 108b may be installed along the interior surface of the stator 102 along a circuit line. In examples, such an inductor coil installation may result in rotation along the circuit line electromagnetic field.

In other embodiments, the inductor coils may be installed so as to create a spiral line along the interior surface 114 of the cylindrical stator 102. As an illustrative example, a first set or pair of inductive coils 104a, 104b may be installed opposite each another, along an axis through the cylindrical housing and conduit, each at the edge of the housing or stator 102 as illustrated in FIG. 1 and FIG. 2. A second set of inductive coils 106a, 106b may be installed above and angled as compared to the first set of inductive coils 104a, 104b, for example at a horizontal angel of about 120 degrees, as illustrated in FIG. 3. A third set of induction coils 108a, 108b may be installed above and angled as compared to the second set of inductive coils 106a, 106b, for example at a horizontal angle of about 120 degrees, as illustrated in FIG. 4. In other words, each set of inductive coils is offset relative to each another along a spiral line. Such an installation of the inductor coils 104a, 104b, 106a, 106b, 108a, 108b along a spiral line results in a rotating electromagnetic field along a circuit line and an oscillating electromagnetic field along a vertical axis of the stator 102.

Figure 7:
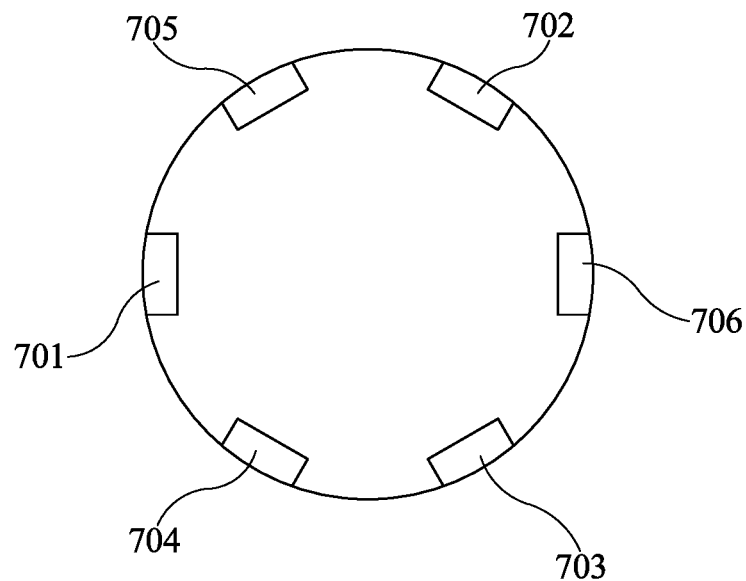
FIG. 7 is a top view of a simple embodiment of a conduit consistent with the description herein illustrating an exemplary placement of two or more inductive coils.
Figure 8:
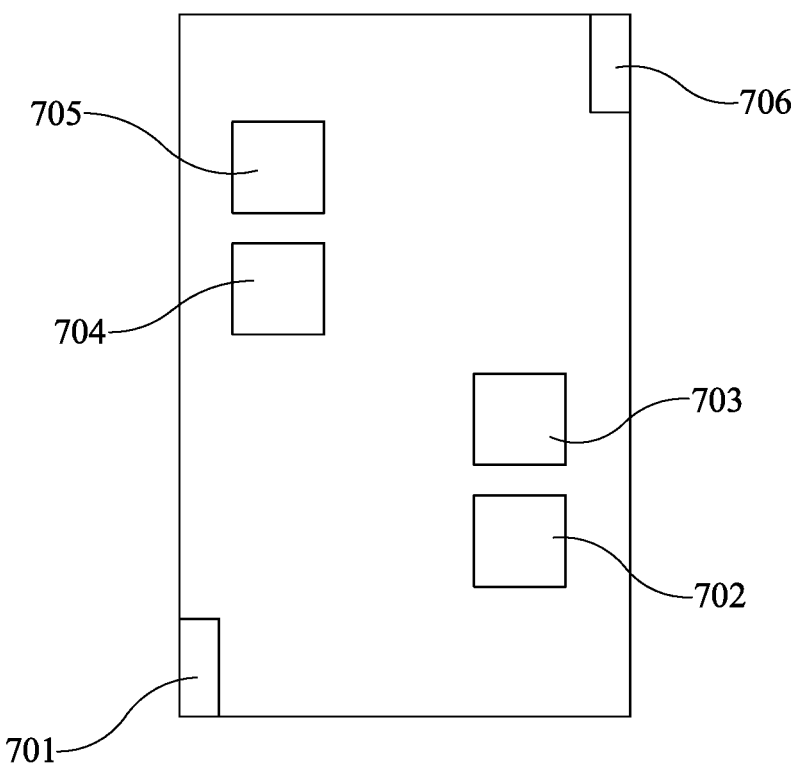
FIG. 8 is a flat front view of the embodiment of FIG. 7.

FIGS. 7 and 8 provide a simpler and clearer view for one example of how rotating and oscillating electromagnetic field and inductive coils may be organized. The embodiment of FIG. 7 illustrates a top view of a simple embodiment of a conduit with two groups of induction coils (701, 702, 703 and 704, 705, 706 respectively). FIG. 8 illustrates the same conduit and inductor coils of FIG. 7 in a flat front view. In some embodiments, the first group of inductor coils 701, 702, 703 may be energized by a three-phase alternative current the following order: 701, 702, and 703. Then the second group of inductor coils 704, 705, 706 may be energized in the following order: 704, 705, and 706. The energization may then be repeated several times, which may result in a rotating and oscillating electromagnetic field in a conduit.

Figure 5:
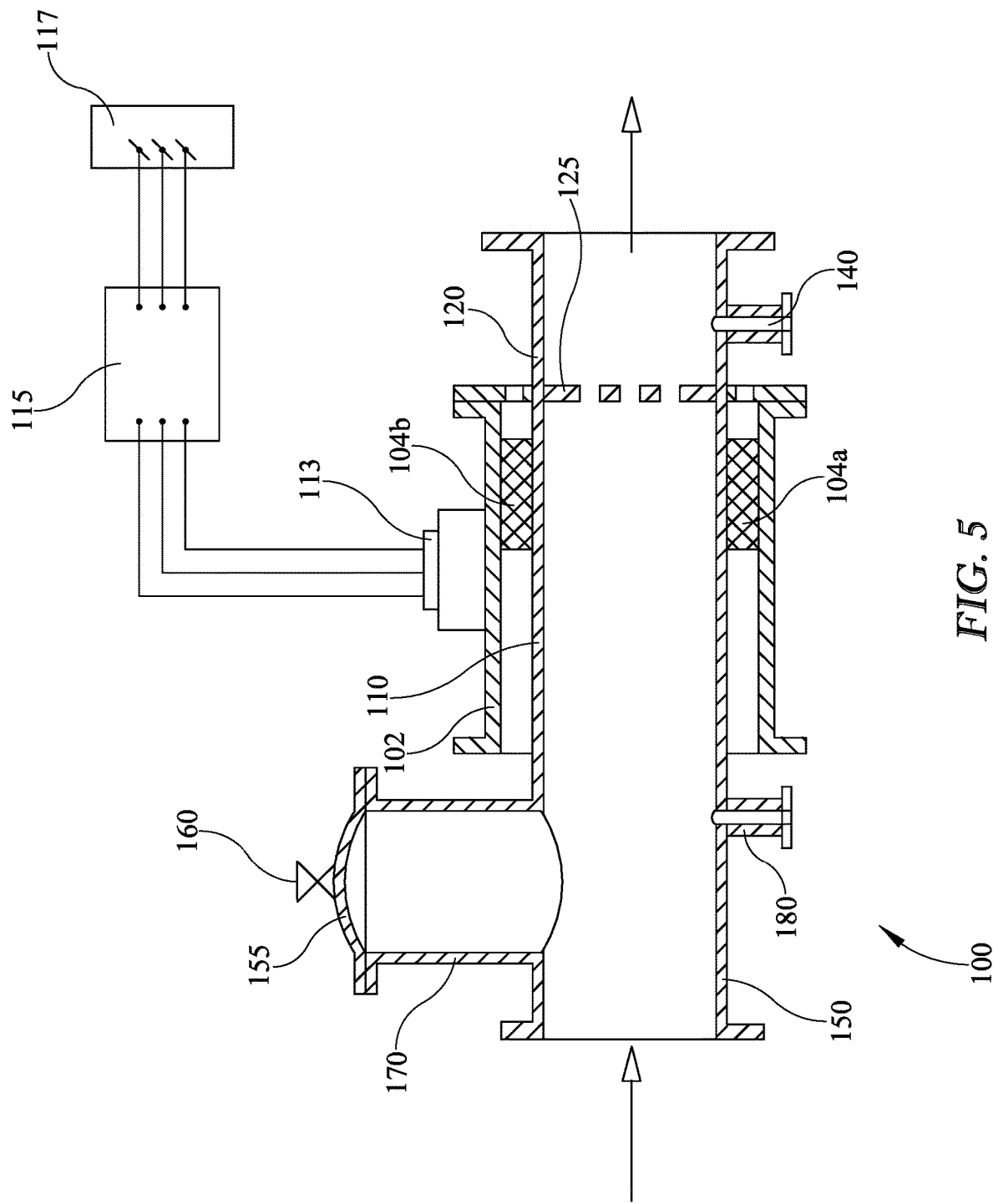
FIG. 5 is a cross-sectional view of another embodiment of the system described herein.

Returning to FIG. 1, a conduit 110 may be installed inside the stator 102, such that a concentric relationship exists between the stator 102 and the conduit 110. Inductor coils 104a, 104b, 106a, 106b, 108a, 108b may be located in the space between the stator 102 and the conduit 110. The conduit 110 may be constructed from dielectric material, for example a thermostable plastic, in order to minimize or prevent electromagnetic field shielding or energy loss. The conduit 110 may also be constructed of a friction sustainable plastic to prevent mechanical erosion. The conduit 110 may further contain a first dielectric section 120 with a perforated baffle 125 allowing fluid to pass through, a disc 130 that secures the conduit 110 to the stator 102, and a pipe or tube 140 adding one or more chemically active agents to a stream of aqueous solution when the electromagnetic field generator system 100 is installed vertically. The disc 130 may utilize screws, welding, adhesives, or any other securing mechanisms known in the art to secure the conduit 110 to the stator 102. The conduit 110 may further contain a second dielectric section 150 with a lid 155. Although illustrated in FIG. 1 as domed or semi-circular in shape, the lid 155 is not so limited and may be flat or any or other shape known in the art. The lid 155 may further contain a gas valve 160 at the end of the conduit. While illustrated at the highest point of the domed lid 155 in FIG. 1, this too is not to be understood as limiting, as the gas valve 160 may be positioned at various locations on the lid 155. The conduit may further comprise a pipe 170 and tube 180 for adding one or more chemically active agents to a stream of aqueous solution when the electromagnetic field generator system 100 is installed horizontally, as illustrated in FIG. 5. In some embodiments, the chemically active agents may include oxidizers, for example hydrogen peroxide, oxygen and/or atmospheric air. In other embodiments, the chemically active agents may include common waste water treatment chemicals, such as organic flocculants, inorganic coagulants, and/or chemicals for pH adjustment, such as hydrated lime, alkali, and/or acids.

The electromagnetic field generator system 100 may have more than one mode of operation. For example, in a first mode of operation the system 100 may be used for aqueous solution electromagnetic activation. In such an embodiment, the induction coils may be energized by a three-phase alternative current, which results in a rotating electromagnetic field inside the conduit 110. A simple electromagnetic field rotation may be created by a first set of inductive coils 104a, 104b, a second set of inductive coils 106a, 106b, and a third set of inductive coils 108*a*, 108*b* along circular line of the stator's 102 internal surface. There may also be rotating and oscillating electromagnetic fields created by a first set of inductive coils 104*a*, 104*b*, a second set of inductive coils 106*a*, 106*b*, and a third set of inductive coils 108*a*, 108*b* when the sets of induction coils are located along a spiral line, such that the second set 106*a*, 106*b* is located above the first set 104*a*, 104*b* at a horizontal angle of 120 degrees and the third set 108*a*, 108*b* is located above the second set 106*a*, 106*b* at a horizontal angle of 120 degrees. FIG. 1 utilizes an arrow to illustrate the flow of the aqueous solution through the electromagnetic field generator system. For example, as illustrated in FIG. 1, the aqueous solution to be treated may enter the system 100 through a first dielectric section 120, pass through a perforated baffle 125 into the conduit 110, and may be withdrawn from the system 100 through a second dielectric section 150 and pipe 170. As the aqueous solution moves through the conduit 110 the rotating, or rotating and oscillating, electromagnetic forces may affect the structure of the aqueous solution, the internal potential energy of the aqueous solution, and/or impurities within the aqueous solution, resulting in electromagnetic activation of the aqueous solution. This activation may be the result of various mechanisms of action as are described herein. In some embodiments, the aqueous solution may be water.

The electromagnetic field generator system 100 may be vertically, as illustrated in FIG. 1, or horizontally, as illustrated in FIG. 5, oriented, without affecting the efficacy of the electromagnetic activation of the aqueous solution. In some embodiments, chemically active agents may be added into the aqueous solution stream through pipe 180. As previously mentioned, in some embodiments, the chemically active agents may include oxidizers, for example hydrogen peroxide, oxygen and/or atmospheric air. In other embodiments, the chemically active agents may include common waste water treatment chemicals, such as organic flocculants, inorganic coagulants, and/or chemicals for pH adjustment, such as hydrated lime, alkali, and/or acids.

An aqueous solution that is electromagnetically activated through this mode of operation may be used to improve seed germination, stimulate plant growth, prevent the formation of scale, hydrate cement or concrete, prepare bioactive compounds for use in a spa or skin care setting, and/or so on.

A second exemplary mode of operation the system 100 may be used for active metals generation in the reduction, oxidation, flotation, coagulation and/or disinfection process or treatment of an aqueous solution. In such an embodiment, it may be desirable, although not necessarily required, to utilize the system 100 in a vertical orientation, such as illustrated in FIG. 1. In such embodiments, prior to operation the lid 155 may be opened and the conduit 110 loaded with a plurality of pieces of the metal 190. In some embodiments, the plurality of metal pieces 190 may be a transitional metal. In particular, the plurality of metal pieces 190 may be iron because of iron's ability to be mechanically agitated in a magnetic field due to the free electrons within the material. In other embodiments, other transitional metals, such as aluminum, manganese, wolframs, zinc, and so on may be added. The pieces of metal 190 may be a plurality of different shapes, for example spherical, cylindrical, or any other shape which causes mechanical activity within the fluid stream. The pieces of metal 190 may also vary in size; for example the pieces may range from about 5-10 millimeters to about 30-40 millimeters. In some embodiments, Nano Iron and Zero Valent Iron particles/powder can be also applied in the conduit.

In some embodiments, metal scrub/shavings from metal processing waste may be used as well. In other embodiments, a cartridge (not shown) with the metals pieces and/or the metal scrub/shavings contained within it may be used to facilitate loading the metal pieces into the conduit 110, such a cartridge may be more convenient and less time consuming for an operator. For example, a basket may be utilized to retain the metal within the conduit and maintain them in position while allowing both movement and agitation of the metal material in the magnetic field while also allowing fluid to flow through the basket. In some embodiments, the internal portion of the conduit 110 may function as a reservoir for metal pieces 190.

The plurality of pieces of metal 190 such as metal scrub/shavings, or similar material, may occupy an internal volume 112 of the conduit 110 and may leave empty space (e.g. pore space), and the metal pieces may be positionally maintained within the area of the inductor coils. A perforated baffle 125 within conduit 110 may define a first end of an active zone, and may keep the pieces of metal 190 (metal scrub/shavings, or the like) in the active zone. The remainder of the active zone may be defined by the sets of inductive coils 104*a* and 104*b*, 106*a* and 106*b*, 108*a* and 108*b*, as illustrated in FIG. 1. In some embodiments, there may only be baffle 125, without any corresponding upper or opposing baffle. In such instances, the weight and/or size of the pieces of metal 190 prevent their upstream movement with the aqueous solution. However, some smaller and/or lighter metal particles (e.g. iron hydroxide) may flow upstream with the aqueous media. In some embodiments, the upstream flow of smaller and/or lighter metal particles (e.g. iron hydroxide) may be desirable, as it may provide surfaces available in the aqueous media for regeneration of the pieces of metal 190. Additionally, once the inductive coils are energized the magnetic forces generated may assist in keeping the pieces of metal 190 within the active zone of the conduit.

The perforations of the perforated baffle 125 located between housing/stator 102 and conduit 110 may allow air to pass along the conduit 110, this ventilation may minimize or prevent the inductive coils 104*a* and 104*b*, 106*a* and 106*b*, 108*a* and 108*b* from overheating while electrical current is applied. In some embodiments, the perforations of the perforated baffle may be smaller than the plurality of pieces of metal 190, thus preventing from escaping the conduit 110.

In other embodiments, a screen or similar structure may be used to retain the pieces of metal within the conduit 110. Further, in some embodiments, a fan may be utilized to ventilate the inductive coils 104*a* and 104*b*, 106*a* and 106*b*, 108*a* and 108*b*. In some embodiments, the inductive coils may be temporally energized by a three-phase alternative current while the plurality of metal pieces 190 are loaded into the conduit 110. This may be desirable, in some instances, because the forces of the electromagnetic field may assist and speed up the process of moving of the metal pieces 190 into conduit 110. Furthermore, the force of the electromagnetic field may also assist in distributing and keeping the metal pieces 190 homogeneous throughout the conduit 110. This temporary energizing may be particularly desirable in instances where the system 100 is horizontally oriented, as illustrated in FIG. 5, where the plurality of metal pieces 190 (metal scrub/shavings or the like) are loaded into the conduit 110 through pipe 170. Once the metal pieces 190 are loaded the lid 155 may be closed; after the lid 155 is closed the system 100 may be ready to operate.

The aqueous solution to be treated may enter the system 100 through the first dielectric section 120 and may be withdrawn from the system 100 through the second dielectric section 150 and pipe 170. In some embodiments, the aqueous solution may be pumped into the first dielectric section 120 and into the system 100; while in other embodiments, the aqueous solution may be allowed to naturally flow (e.g. through gravity) into the first dielectric section 120 and into the system 100. Once in the electromagnetic field generator system 100, the aqueous solution may freely flow throughout the conduit 110, including through the empty space (pore space) which his generally populated by the plurality of agitated metal pieces caught in the flux of the magnetic field.

Once the aqueous solution enters the conduit 110 loaded with the plurality of metal pieces 190 the sets of inductive coils 104a and 104b, 106a and 106b, 108a and 108b may be energized by a three-phase alternative current. In some embodiments the sets of inductive coils 104a and 104b, 106a and 106b, 108a and 108b may be energized through connection with a suitable terminal 113 that is directly connected to a three phase electric current source 117. In other embodiments, the sets of inductive coils 104a and 104b, 106a and 106b, 108a and 108b may be energized through connection with a suitable terminal 113 connected to a three-phase electric current source 117 through a variable-frequency drive 115. This energization may result in a rotating electromagnetic field inside the conduit 110. A first electromagnetic field may generate rotation, along a circular line on the internal surface of the stator 102, may be created with each the first set of inductive coils 104a, 104b, the second set of inductive coils 106a, 106b, and the third set of inductive coils 108a, 108b. Each set of inductive coils 104a and 104b, 106a and 106b, 108a and 108b work as electromagnets, attracting the plurality of ferromagnetic metal pieces 190 (i.e. iron pieces), which results in rotating movement of the plurality of metal pieces 190.

Multidimensional electromagnetic field(s) may be generated, which may result in the multidimensional movement of the plurality of metal pieces 190. A first electromagnetic field may generate rotational movement resulting in the induction of winding electric currents in the plurality of metals pieces 190 (both ferromagnetic and diamagnetic metal pieces), and a second electromagnetic field may also be generated. Interaction between the first and second electromagnetic fields may exist, and in some embodiments such interaction may be strong. The first electromagnetic field may cause movement of the metal pieces 190. In some embodiments, the metal pieces are in direct contact with each other, and as such movement may be limited and the metal pieces 190 may vibrate upon exposure to the first electromagnetic field, as opposed to experiencing movement over larger physical distances. Vibration of the metal pieces 190 may occur when metal pieces consolidate due to gravity. The amount of empty space (pore space) may correlate to the ability of the metal pieces 190, including metal scrub/shavings, to move as a result of vibration. It is for this reason that, in some embodiments, it may be desirable to load the plurality of metal pieces 190 in such a way as to maximize the free space (pore space) within the active zone of the conduit 110, or in other words, minimize the compacting of the metal pieces 190.

In embodiments, where each set of inductive coils 104a and 104b, 106a and 106b, and 108a and 108b is offset relative to each another along a spiral line, as illustrated in FIGS. 2-4, three dimensional electromagnetic forces that act multi-dimensionally (e.g. horizontally and vertically) are created. For example, vertically oriented forces lift metal pieces 190 up and down, which may support vertical vibration in order to increase the room/pore space between the metal pieces 190, and thus support vibrational movement in both vertical and horizontal directions.

Although referred to in terms of horizontal and/or vertical such terms are not limited to any particular orientation. For example, in some embodiments, the conduit may be positioned across multiple axis, such as diagonal, or be inclusive of multiple conduits all included within a generated magnetic field. In other embodiments, multiple individual conduits may be utilized which share or which create independent magnetic fields relative to each other.

Figure 6:
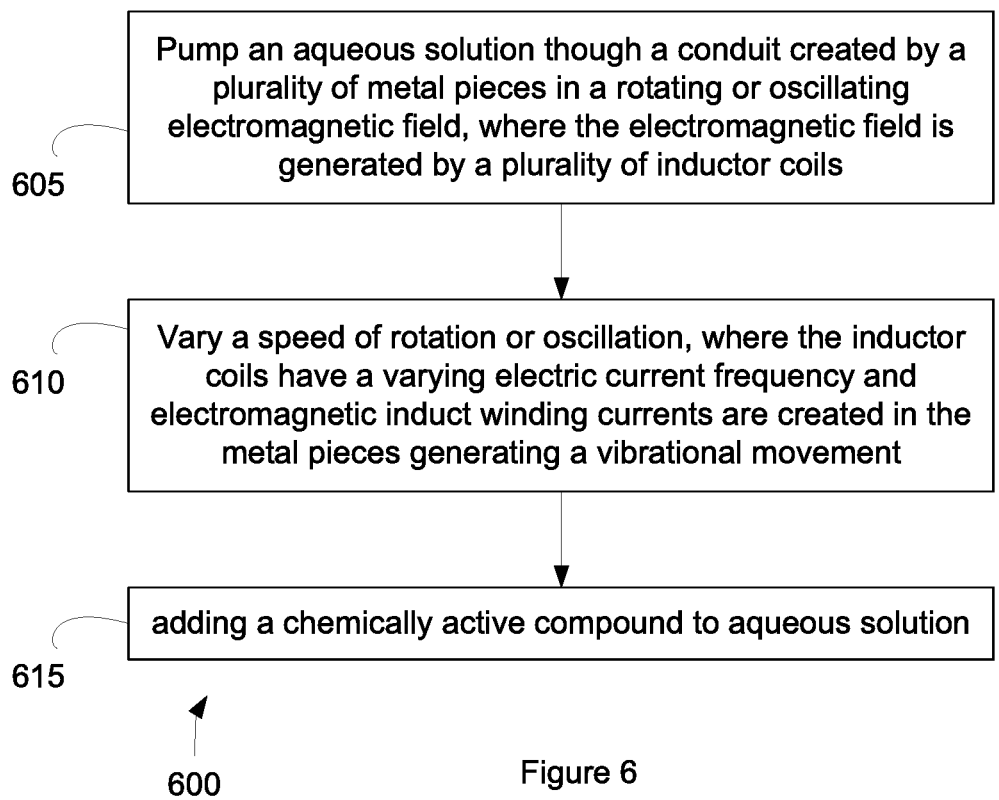
FIG. 6 is a flowchart illustrating an example method of electromagnetic activation or active metals generation.

Referring now to FIG. 6, a flowchart illustrating an exemplary method of electromagnetic activation or active metals generation 600 is shown. In block 605, an aqueous solution is pumped though a conduit, where the conduit contains a plurality of metal pieces that are rotating and/or oscillating in an electromagnetic field, where the electromagnetic field is generated by a plurality of inductor coils. In some embodiments, the plurality of inductor coils includes at least three inductor coils, but preferably six inductor coils. In some embodiments, the inductor coils may be placed in varying offset vertical positions, for example along a spiral line as described previously herein. In some embodiments, two pairs of inductor coils are placed in varying offset vertical positions. In still other embodiments, three pairs of inductor coils are placed in varying offset vertical positions.

In some embodiments, the metal pieces may be various shapes and sizes. In other embodiments, the metal pieces may be metal scrub or shavings from metal processing. In some embodiments, Nano Iron and Zero Valent Iron particles and/or powder may be also applied in the conduit. In still other embodiments, the metal pieces may be transition metals, preferably iron.

In block 610, the speed of rotation and/or oscillation is varied, where the inductor coils have a varying electric current frequency and electromagnetic induct winding currents are created in the metal pieces generating a vibrational movement. In some embodiments, the inductor coils may be energized by three phase alternating current with a basic frequency of about 50 Hz to about 60 Hz. In other embodiments, the inductor coils may be energized by three phase variable frequency alternating current. In some embodiments, the frequency of the rotating and oscillating electromagnetic field may be set up for parametric resonance in the vibrational movement of the pieces of metal.

In block 615 a chemically active compound is added to the aqueous solution. In some embodiments, the chemically active compound may be an oxidizing agent. In other embodiments, the chemically active compound may be a flocculant, including but not limited to a cationic, anionic, or nonionic polymer, or a coagulant, including but not limited to, iron, aluminum, zinc salts, a fine clay, hydrated lime, zeolite, alkali, or acid.

In some embodiments, the electromagnetic field generator 100 system and methods described herein may be utilized to: stimulate seed germination and plant growth; generate bioactive water that may be used in agriculture applications and/or spa applications; to increase water solubilizing and hydrating ability resulting in scaling prevention in heat exchange processes, cement or concrete hydration, etc.; and to induce spore production in certain bacteria, followed by the inactivation of said bacteria through the application of heat, biocides, and the like.

In other embodiments, the electromagnetic field generator 100 system and methods described herein may be utilized for the generation of active metals, which may be utilized for: breaking down, or decomposing, organic contaminants, including dehalogenation/dechlorination. The generated active metals may be used to break down: chlorinated hydrocarbons, including but not limited to, TCE (trichloroethylene), chlorophenols, etc.; fluorinated hydrocarbons; nitro-aromatic compounds (e.g. azo dyes, etc.); and inorganic contaminants including, but limited to, nitrates, heavy metals (e.g. Cr, As, Pb, Hg, etc.).

In still other embodiments, the electromagnetic field generator 100 system and methods described herein may be utilized for breaking down, or decomposing, polycyclic organic compounds, crude oil hydrocarbons and petrochemicals, a wide variety of dyes, pesticides, surfactants, explosives, and/or the like.

In some embodiments, the electromagnetic field generator 100 system and methods described herein may be utilized for generation of active metals utilized in the coagulation, and disinfection processes, which are effective for use in process, blowdown, fracking, and/or different types waste water purification.

EXAMPLES

An electromagnetic field generator system 100, used as described above, may result in the generation of active metals generation in reduction, oxidation, flotation, coagulation, and disinfection of aqueous solution. The mechanism of action for such generation of active metals in aqueous solution may vary. Several exemplary mechanisms are discussed herein.

Example 1

Various pieces of metal, including metallic scrub, move in intensive vibrational movement, resulting in contact between the various pieces, as well as the breaking and restoration of these pieces many times per second. For example, a speed V (revolution per minutes or rpm) of the electromagnetic field rotation in horizontal plane is defined by the known formula:

$$V=120 f/n$$

Where "f" is equal to frequency (hertz) and "n" is equal to the number of poles.

In a stator with six poles, such as electromagnetic field generator system 100 described above, an industrial three phase alternating current with a frequency 60 Hz forms a rotating electromagnetic field with speed of 1200 rpm. This means that the magnetic force involving the movement of the pieces of metal has frequency 20 Hz, without accounting for relative slip that is typical for asynchronous systems, which is the same speed in terms of revolutions per minute which is only in a vertical dimension. The magnetic force involved in the movement of the pieces of metal is equal to 20 Hz vibrational movement, both in horizontal and vertical dimensions. Because the pieces of metal have numerous contacts, or interactions (including both physical and chemical interaction), with each other and are moving within a contained space, thus parametric resonance results when a three phase alternative current frequency is adjusted by a variable-frequency drive (e.g. variable-frequency drive 115 of FIG. 1) to specific a frequency that results in the most intense vibrational movement of the metallic pieces. Variable frequency drive was applied and the frequency varied from 4 to 60 Hz. The most intensive vibrational movement was detected at frequency range 30-40 Hz, which is a parametric resonance. The vibrational movement of the metallic pieces results in intense friction, which in turn results in surface irritation, braking, and fine particle release into the surrounding aqueous solution of the metallic pieces. In other words, this friction results in ultra-dispersed, or nano-scale, metallic particles.

In some instances, the metal pieces loaded into a conduit, have been preliminarily oxidized and/or the surfaces of the metal pieces may be coated with hydroxides/oxides (for example, due to contact with the air, moisture, and/or any other oxidizing agents), the vibrational movement and friction within the conduit rapidly disperses these oxides into the surrounding fluid media in form of fine particles. This dissipation "cleans" the surface of the metal pieces (i.e. removing the oxides) and opens the surface of the metal pieces up for physical and/or chemical interactions.

Fine particles of iron, as well as other metals, are highly chemically active, and thus are they available to release and/or accept electrons, allowing these metallic particles to act as potent catalysts. Furthermore, the fine particles dispersed have a large specific surface area and are highly active in the absorption of dissolved and dispersed organic and inorganic contaminants.

Example 2

The rotating electromagnetic field created by the system 100 affects the dimensions of the pieces of metal, through magnetostriction, a property of ferromagnetic materials that causes them to change shape, size, and/or one or more dimensions during magnetization. When electromagnetic field acts on a piece of metal, the result is a slight increase in dimension. The amplitude of the dimensional change is typically small, for example several micro millimeters; however, this is enough to create micro turbulence streams in the aqueous solution and to intensify the diffusion process at the metallic pieces-aqueous solution interface. Furthermore, this metallic piece-aqueous solution interface creates dynamic forces that are capable of creating various defects in the metal pieces, thus stimulating their decomposition to fine particles and release into the aqueous solution.

Example 3

Vibrational movement of the metal pieces, as well magnetostriction, involve interaction with the aqueous solution, which is also subject to macro and micro vibrational movement. This interaction with the aqueous solution results in intensive mixing that homogenizes the aqueous solution and the metal pieces added to conduit and intensifies the physical-chemical interactions within the conduit. For example, if a chemically active agent is added through a pipe (e.g. pipe 140 or pipe 180 illustrated in FIGS. 1 and 5) the vibration rapidly dissolves or disperses the added chemically active agent, which may intensify the interaction with targeted contaminants. As discussed previously, chemically active agents may include oxidizers, for example hydrogen peroxide, oxygen and/or atmospheric air; or, chemically active agents may include common waste water treatment chemicals, such as organic flocculants, inorganic coagulants, and/or chemicals for pH adjustment, such as hydrated lime, alkali, and/or acids.

Example 4

The rotating electromagnetic field created by the system 100 generates winding currents in the metal pieces, which means variable anode-cathode pairs are formed by winding current within each piece of metal. As known in the art, an anode is electron deficient and a cathode is electron rich. The winding current and formation of anode-cathode pairs stimulates the process of mobile electrons spontaneously being emitted from the surface of a piece of metal into the surrounding aqueous solution. If the typical process results in an electron equilibrium, meaning the number of electrons that are emitted from the metal pieces is equal to the number of electrons returning to the metal pieces due to the electrostatic interaction between the negatively charged electrons and positively charged metallic surface, the process stimulated by the winding current results in the emission of a larger number of electrons from the surface of the metallic pieces. These electrons are then available to be accepted by organic and/or inorganic pollutants and/or organic and/or inorganic contaminants in the aqueous solution. This process affects the stability and availability of the pollutants and/or contaminants for chemical interactions.

Furthermore, these are high energy electrons with the ability to be accepted by oxygen or/and hydroxyl groups on the surface cathode metal pieces. When electrons are accepted by oxygen a superoxide-radical $O_2$ is generated, and when electrons are accepted by hydroxyl groups a hydroxyl-radical OH is generated. Both superoxide-radical $O_2$ and hydroxyl-radical OH are potent oxidizers, which affect inorganic and organic contaminants, including microorganisms.

Where the metal pieces are iron, there is a conversion of the "zero" valent iron into two and three valent iron cations, as well as the electrolysis of water into oxygen and hydrogen. These processes are described by the following known formulas:

Anodic reaction: $Fe^0 \rightarrow Fe^{2+} + 2e^- \rightarrow Fe^{3+} + 3e^-$ $2H_2O \rightarrow O_2 + 4H^+ + 4e^-$ Cathodic reaction: $2H_2O + 2e^- = 2H^+ + 2OH^- = H_2 + 2OH^-$ When the anodic components of the metal pieces dissolves, they release two valent electrons into the aqueous solution. As such, each piece of metal, or metal scrub/shavings, is a "sacrificial electrode," meaning it dissolve and its mass reduces over time. When pieces of metal dissolve, additional metal pieces may need to be loaded into the conduit.

Anodic and cathodic reactions (provided above) also result in oxygen and hydrogen microbubbles formation in the aqueous media, and these microbubbles float to the top of the conduit. These microbubbles are then absorbed by the fine particle contaminants, which results in the flotation, and subsequently the removal of, these contaminants from the aqueous solution, hence the term electro-floatation.

It is worthy of note that anodic and cathodic reactions predominate over other processes, such as oxidation or corrosion of the metals; however, these reactions also take place even where an electromagnetic field is not present. These reactions include:

Anaerobic reaction: $Fe^0 + H_2O \rightarrow Fe^{2+} + H_2 + 2OH^-$

Aerobic reaction: $2Fe^0 + O_2 + H_2O \rightarrow 2Fe^{2+} + 4OH^-$

In both anaerobic and aerobic reactions, electrons are transferred to an oxidized organic and/or inorganic contaminant, resulting in their reduction. The presence of hydrogen increases the reduction potential and stimulates this process. For example, intensive dechlorination may take place in case of chlorinated hydrocarbons reduction, such as TCE, chloro-phenols, etc.; and inorganic compounds reduction, such as nitrates reduction to ammonia and nitrogen-gas, hexavalent chromium to three valent chromium, pent-valent arsenic to three valent, etc. may also take place.

Furthermore, two valent iron, as well as superoxide radical and hydroxyl radical (which result from the above reactions) are potent biocides, resulting in the inactivation of various microorganisms and disinfection of the aqueous solution.

Example 5

The metal pieces act may as sacrificial electrodes that continuously produce ions in the aqueous solution. The released ions initiate coagulation, removing contaminants by chemical reaction, precipitation, and/or by coalescence and floatation. For example, two valent iron interacts with hydroxyl groups and oxygen, which results in formation of ferrous hydroxide Fe(OH)2 (which is soluble) and ferric hydroxide Fe(OH)3 (which is insoluble). For example, the use of fresh scrap metal produces about 24 ppm of iron (as Fe) content in water after about 3 minutes. In instances where the sacrificial metal remains in the water for a period of time and develops rust, a rotating and oscillating electromagnetic field may be started, which creates about 120 ppm of iron, in form of iron hydroxides/oxides in the water. Iron hydroxides are potent coagulants, that when utilized result in the suspension of contaminants, coagulation to large flocks, and/or dissolution of impurities. These coagulates are available for removal through precipitation, filtration, and/or centrifugation; thus allowing the purification of the contaminated aqueous media.

Example 6

The two and three valent iron cations that are generated by the processes and machines described herein are extremely chemically and biologically active, because they are not associated with opposite anions (e.g. sulfate, chloride, etc.) which neutralize their electric charge. Zero and two valent iron are potent reductants due to their ability to release electrons, resulting in two valent iron and three valent iron, which are potent oxidants due to their ability to accept electrons. The oxidizing capability of iron may be strengthened by the addition of another oxidative agent(s) to the process. For example, hydrogen peroxide is an effective oxidant that may be added into the conduit through a pipe (e.g. pipe 140) of FIG. 1 in case of the system vertical disposition). The interaction of hydrogen peroxide with two and three valent iron may also be described in commonly recognized terms and chemical formulas for Fenton's reagent:

$Fe^{2+} + H_2O_2 \rightarrow Fe^{3+} + HO\cdot + OH^-$ $Fe^{3+} + H_2O_2 \rightarrow Fe^{2+} + HOO\cdot + H^+$ Hydroxyl radical HO. and hydroperoxyl radical HOO. are commonly recognized byproducts of the interaction with Fenton's reagent. Fenton's reagent is a solution of hydrogen peroxide and iron (II) sulfate, or in other words—ferrous sulfate. The system and methods described herein electrochemically generate two and three valent iron catalysis of hydrogen peroxide disproportionately into oxidative radicals. In comparison with Fenton's reaction, no such highly acidic and corrosive reagents as ferrous sulfate are required in systems and methods described herein. Furthermore, it is well known that Fenton's reaction requires a long period of time, for example several minutes to several hours. The reactions of the systems and methods described herein occur at an accelerated rate due to the physical effects described in Examples 1, 2, and 3.

Free radicals are potent, non-selective oxidants. The oxidation of organic compounds is rapid and results in the oxidation of contaminants, primarily to carbon dioxide and water. Polycyclic hydrocarbons, crude oil hydrocarbons and petrochemicals, various dyes, pesticides, surfactants, explosives, and many other substances may be capable of being simply and cost effectively decomposed by the method and system described herein. It may be desirable, in some instances, for the aqueous media to have a pH between about 2.5 to about 6.5. Higher pH may result in the rapid conversion to and precipitation of ferric hydroxides, which results in the conversion of hydrogen peroxide to oxygen and water without the formation of hydroxyl radicals. While oxygen is also a potent oxidizer, its oxidative power is less than twice than that of free radicals. Oxygen will oxidize organic compounds, but to a lesser degree than free radicals. However, oxygen will significantly stimulate the conversion of zero iron to two valent iron as illustrated in the reaction above, which stimulates the reduction and the release of electrons.

Example 7

The use and advantages of hydrogen peroxide are described in Example 6. However, in some instances it may not be desirable to utilize hydrogen peroxide. For example, industrial grade hydrogen peroxide may spontaneously decompose and release oxygen, which may result in high pressure within the conduit, as well as a flammable and explosive atmosphere. Thus, in some instances, it may be desirable to replace hydrogen peroxide with oxygen or atmospheric air (which may contain as much as approximately 23% oxygen). In such instances oxygen or atmospheric air is added into the conduit through a pipe (e.g. pipe 140 of FIG. 1, where the system is oriented vertically). Excessive oxygen or atmospheric air that is not involved in chemical interaction, or dissolved in the aqueous media, is removed from the conduit through the lid and gas valve of the system (e.g. lid 155 and gas valve 160 of FIG. 1). As described in Example 4, the rotating and oscillating electromagnetic field generates winding currents in the metal pieces generating variable "anode-cathode" pairs within each piece of metal. An excessive electron concentration interacts with oxygen alone, or oxygen in atmospheric air, in accordance with a commonly accepted formula for an electro-Fenton reaction on the cathode:

$$O_2 + 2H^+ + 2e^- \rightarrow H_2O_2$$

Oxygen reduction is caused by the acceptance of electrons from the cathodes, and from superoxide radical $(.O_2)$ formation as discussed above in Example 4. Reduced oxygen may then interact with protons that are generated on the cathodes, this results in in situ formation of hydrogen peroxide. This hydrogen peroxide may then interact with two valent iron according to the Electro-Fenton reaction:

$$H_2O_2 + Fe^{2+} \rightarrow Fe^{3+} + HO. + OH^-$$

This reaction results in the formation of hydroxyl radicals (HO.) in aqueous media, as well as the oxidation of organic contaminants as previously described in Example 6.

Oxygen, or atmospheric air, bubbling in conduit results in oxygen, or atmospheric air, generating microbubbles due to physical effects described in detail in Examples 1, 2, and 3. These microbubbles form rapidly, and dissolve in the aqueous solution significantly intensifying the oxidative processes.

Example 8

Standard testing was performed on various seeds in order to determine the effect of electromagnetic water activation (EM) and active iron (AI) on the growth and development of various seeds. Electromagnetic water activation (EM) occurred using the methods and system 100 described herein, without pieces of metal in the conduit, for about three minutes. Seeds were then watered with this EM water. Water was also treated in a conduit 110 with iron pieces 190 for about three minutes resulting in an active iron (AI) media. Seeds were then watered with this AI media. In both instances, the electromagnetic water activation and the active iron, a frequency of 60 Hz was applied. The biomass of the seeds was determined on both a wet and air-dried basis following a few days of growth. The biomass of the treated seeds, both EM and AI were then compared to control seeds, which received only water without any type of treatment.

The results of treated and control mung bean sprouts after a 72 hour germination period are presented in Tables 1 (wet) and Table 2 (air-dried) below.

TABLE 1

Wet Mung Bean Sprout Biomass

| Test Material | Biomass (g) | % Increase* |
|---|---|---|
| Control | 1.53 | — |
| EM | 1.98 | +29.11 |
| AI | 1.82 | +18.85 |

*Percent increase is relative to the control.

TABLE 2

Air-Dried Mung Bean Sprout Biomass

| Test material | Biomass (g) | % Increase* |
|---|---|---|
| Control | 0.37 | — |
| EM | 0.45 | +21.6 |
| AI | 0.42 | +13.5 |

*Percent increase is relative to the control.

The results of treated and control daikon radish sprouts after a 72 hour germination period are presented in Tables 3 (wet) and Table 4 (air-dried) below

TABLE 3

Wet Daikon Radish Sprout Biomass

| Test Material | Biomass (g) | % Increase* |
|---|---|---|
| Control | 0.61 | — |
| EM | 0.96 | +57.4 |
| AI | 1.08 | +77.1 |

*Percent increase is relative to the control.

TABLE 4

Air-Dried Daikon Radish Sprout Biomass

| Test Material | Biomass (g) | % Increase* |
|---|---|---|
| Control | 0.04 | — |
| EM | 0.07 | +75.0 |
| AI | 0.05 | +25.0 |

*Percent increase is relative to the control.

Broccoli seeds and clover seeds were treated (i.e. watered) with electromagnetic water activation (EM) aqueous media, active iron (AI) aqueous media, and untreated water as a control and allowed to germinate for 120 hours. The relative qualitative efficacy of each treatment was compared to each other treatment. For the broccoli sprouts the AI treatment and EM treatment were equally as effective, both being greater than the control. For the clover sprouts the AI treatment was more effective than the EM treatment, both of which were more effective than the control.

Corn seeds were placed in petri dishes and soaked with electromagnetic water activation (EM) aqueous media, active iron (AI) aqueous media, and untreated water as a control and allowed to grow for four days. Stalk length and root length were measured, and the results are presented in Table 5 below.

TABLE 5

Corn Seed Results

| Test Material | Stalk Length | | Root Length | |
|---|---|---|---|---|
| | Mm | % Increase* | mm | % Increase* |
| Control | 30.25 | — | 49.75 | — |
| EM | 40.3 | +33.2 | 80.2 | +61.2 |
| AI | 38.4 | +26.9 | 78.25 | +57.2 |

*Percent increase is relative to the control.

Cucumber seeds were planted in jars with perlite and periodically watered with electromagnetic water activation (EM) aqueous media, active iron (AI) aqueous media, and untreated water as a control and allowed to grow for four days. After four days the seedlings height was measured. Results are presented in Table 6 below:

TABLE 6

Treated vs. Control Cumber Seed Height

| Test Material | Seedlings Height (Average in mm) | % Increase |
|---|---|---|
| Control | 16.8 | — |
| EM | 57.2 | +240.5 |
| AI | 55.8 | +232.1 |

*Percent increase is relative to the control.

These tests demonstrate that aqueous media (e.g. water) that was electromagnetically activated and aqueous media (e.g. water) with active iron content significantly stimulated the germination, growth, and development of a variety of types of seeds.

Example 9

Pieces of metal 190, specifically iron, were placed into the conduit 110 of the system 100 as described herein in order to evaluate the treatment/decontamination of trichloroethylene (TCE) contaminated water. The treatment lasted for three minutes at a frequency of 60 Hz. TCE contaminated water was discolored, and transparent; treatment changed the colorization of the water to a grey-yellow, which indicates the presence of dispersed iron hydroxide and oxides in the liquid. Treated water was stored for 24 hours, which resulted in yellow to brown sediment and clear supernatant. Original water and supernatant were analyzed for TCE content. TCE content in treated water was found to be reduced by about 50%, with a dissolved/dispersed iron content of 28 ppm. Comparative test with zero iron also resulted in an about 50% TCE reduction after about 3000 minutes with a commercial zero iron powder content 20,000 ppm.

Example 10

Contaminated underground water from mine shafts was treated utilizing the system 100 described herein. This contaminated water was placed into the conduit 110 of the system 110 with a plurality of metal pieces 190 for about three minutes. The treated water was then stored for about 24 hours in order to precipitate solids (via gravity). Supernatant was then separated from the precipitated sediment and analyzed for its content of harmful impurities. The content of various contaminant in original (control) sample and active iron (AI) treated water is presented in Table 7 below.

TABLE 7

Treated vs. Control Mine Shaft Water Contaminant Content

| | Sample | | Required to be Approve |
|---|---|---|---|
| Parameter | Control | AI | for Water Quality |
| Arsenic, mg/L | 1.77 | Not detected | <0.20 |
| Iron, mg/L | 1.5 | 0.2 | <0.3 |
| Total Dissolved Solids, mg/L | 5090 | 3290 | <4000 |
| pH | 7.3 | 7.5 | 7.0-8.0 |

Therefore, as illustrated in this example treatment of waste water, such as water removed from underground mine shafts results in the effective removal of the contaminants, such as arsenic, iron, dissolved solids, etc. to levels that are below approved levels.

Example 11

Waste water from areas of underground fracturing for the stimulation of oil and gas release was tested. Fracking water is a brown-red aqueous solution that often has a specific "organic solvent" smell. Fracking water has a pH of 5.4. A first test was conducted, where the fracking water was placed in the conduit 110 of the system 100 described herein with a plurality of metal pieces 190 (specifically, iron scrap/shavings) at frequency 60 Hz. The pH of the water was then tested at various time intervals. The results are presented in Table 8 below.

TABLE 8 pH of Treated Fracking Water

| Time (min) | 0 | 1 | 2 | 3 | 4 | 5 | 10 | 15 |
|---|---|---|---|---|---|---|---|---|
| pH | 5.4 | 7.66 | 8.13 | 8.33 | 8.42 | 8.49 | 8.6 | 8.64 |

The results, provided in Table 8, illustrate that treatment of fracking water results in the rapid neutralization of pH acidity, and as time progresses even alkalization of the water. As Table 8 illustrates, the pH significantly changes within the first three minutes of the treatment. Following treatment yellow/brown flocks appeared in the water, and storage of the treated water resulted in thick, multilayer sediment at the bottom of the container—white sediment on the bottom and brown sediment on the top.

Example 12

Qualitative tests were running on second kind of fracking water, which is a yellow aqueous solution with a pH of about 4.52. Several separate treatment variations were tested: a) fracking water and metal pieces 190 in the conduit 110 of the system 100; b) fracking water, metal pieces 190, and air bubbling through the conduit 110 of the system; and (c) fracking water, hydrogen peroxide, and metal pieces 190 in the conduit 110 of the system. Each treatment lasted for about one minute, and the water was discharged into a jar for observation and analysis.

The first treatment, where the fracking water was treated in the conduit that contained on metal pieces and the fracking water resulted in colorization of the water (originally yellow) to yellow-black solution with the formation of some brown flakes following precipitation. The pH changed from the original 4.52 to 5.72.

The second treatment, where the fracking water was treated in the conduit that contained metal pieces and had air bubbling through it resulted in the colorization of the water (originally yellow) into a black solution with pH 6.78. The formation of many brown flakes occurred, and the smaller flakes floated to the top, while the larger flakes sunk to the bottom of the jar.

The third treatment, where the fracking water was treated in the conduit with metal pieces and hydrogen peroxide (3%), was conducted in stages. First, just the combination of the fracking water, hydrogen peroxide, and metal pieces in the conduit were observed. This combination alone did not yield any visible reaction, even after increasing the hydrogen peroxide content. Next, the system was energized with 3-phase alternative current at frequency 60 Hz and observed. The hydrogen peroxide decomposes into oxygen bearing species, causing oxygen microbubbles to form. The intensity of the decomposition of the hydrogen peroxide was found to depend on a hydrogen peroxide-water ratio. The best result was achieved where the hydrogen peroxide (3%)-water ration was between about 1:8 to about 1:16. For example, at a ratio of 1:16 micro-bubbles result in water, which allow small flakes to float to the top surface of the liquid. Micro-bubbles also result when the ratio is 1:8; however, at a ratio of 1:8 much large flakes rapidly float to the top surface of the liquid. Filtration of this water through a 200-micrometer filter resulted in the complete removal of flakes and clear, transparent water with pH of 3.68 without the original fracking water smell.

As demonstrated above, each treatment of the fracking water with the system 100 described herein utilized different mechanisms to remove various contaminants from the fracking water.

Example 13

The same fracking water used in Example 12 is utilized again in this Example. Untreated fracking water was combined with a humic acid based flocculant (organic anionite) and lightly mixed. The large amount of dissolved salts and chemicals in the water resulted in a poorly mixed solution, as the flocculant did not dissolve or disperse in the liquid, rather the flocculant flaked into the surrounding liquid. The mixture was placed into the conduit 110 of the system 100 with metal pieces and the system was energized at frequency 60 Hz, which resulted in the intensive vibration of the metal pieces inside the conduit 110. Treatment lasted for one minute. The treatment resulted in flocculant dispersion and dissolution in the water, as well as the flocculation of some contaminants into large flakes, which were easily removal through precipitation and/or filtration. The treatment and the removal of flakes via precipitation and/or filtration resulted in clear, transparent water.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

I claim:

1. A system for electromagnetic activation, wherein said system comprises:
    a cylindrical housing;
    a plurality of inductor coils connected to a three phase alternating current source, wherein the inductor coils are positioned in an interior space between the cylindrical housing and an exterior face of the system;
    a conduit secured inside the cylindrical housing, wherein the conduit further includes:
        a first dielectric section comprising a perforated baffle;
        a tube for adding a chemically active agent into the conduit;
        a second dielectric section with a lid and a gas valve positioned on top of the lid at a second end of the conduit;
        an inlet for an aqueous media disposed at a first end of the conduit and an outlet disposed proximate the second end of the conduit; and
        a plurality of metal particles occupying an internal volume of the conduit and maintained in a relative position with respect to the inductor coils.

2. The system of claim 1, wherein the plurality of inductor coils are positioned in a plurality of pairs, wherein a first coil is directly opposite of a second coil along an axis through the cylindrical housing and conduit.

3. The system of claim 2, wherein the pairs of inductor coils are positioned where a second pair is installed above and angled as compared to a first pair, such that the pairs are positioned along a spiral line.

4. The system of claim 3, wherein the first and second pairs positioned along the spiral line create a rotating magnetic field.

5. The system of claim 1, wherein the plurality metal particles occupying the internal volume of the conduit are Nano Iron or Zero Valent Iron powder.

6. A system for electromagnetic activation comprising:
    a cylindrical housing;
    a plurality of inductor coils connected to a three phase alternating current source positioned in an interior space between the cylindrical housing and an exterior face of the system; and
    a conduit installed inside the cylindrical housing and inside of the plurality of inductor coils, wherein the conduit further includes:
        a plurality of metal pieces occupying an internal volume of the conduit and wherein the plurality of metal pieces are positionally maintained within an active zone,
            wherein the active zone is defined at a first end by a perforated baffle within the conduit and defined at a second end by the plurality of inductor coils;
        a first dielectric section comprising a perforated baffle;
        a tube for adding a chemically active agent into the conduit;
        a second dielectric section with a lid and a gas valve;
        an inlet for an aqueous media;
        wherein the plurality of inductor coils are positioned in a plurality of pairs such that a first coil of the pair is directly opposite of a second coil of the pair.

7. The system of claim 6, wherein first and second pairs positioned along a spiral line create a rotating magnetic field.

8. The system of claim 7, wherein the rotating magnetic field alters at least one dimension of at least one of the plurality of metal pieces.

9. The system of claim 6, wherein the metal pieces occupying the internal volume of the conduit are a plurality of shapes.

10. The system of claim 6, wherein the metal pieces occupying the internal volume of the conduit are about 5-10 millimeters to about 30-40 millimeters in size.

11. The system of claim 6, wherein the metal pieces occupying the internal volume of the conduit are Nano Iron or Zero Valent Iron powder.

12. The system of claim 6, wherein the metal pieces occupying the internal volume of the conduit are comprised of a transitional metal, preferably iron.

13. A method of electromagnetic activation of water or active metals generation comprising:
    pumping an aqueous solution through an inlet into a conduit containing a plurality of metal pieces in a rotating and/or oscillating electromagnetic field, wherein the electromagnetic field is generated by a plurality of inductor coils;
    varying a speed of rotation and/or oscillation of the electromagnetic field, wherein the inductor coils have a varying electric current frequency and wherein electromagnetic induction winding currents are created in the metal pieces generating a vibrational movement; and adding a chemically active compound through a tube to the aqueous solution.

14. The method of claim 13, including providing the plurality of inductor coils at varying offsetting vertical positions.

15. The method of claim 14, further including at least two pairs of inductor coils at the varying offsetting vertical positions.

16. The method of claim 15, wherein at least three pairs of inductor coils are provided at varying offsetting positions relative to each other pair.

17. The method of claim 13, further including energizing the inductor coils by three phase alternating current with a basic frequency of about 50 Hz to about 60 Hz.

18. The method of claim 13, further comprising energizing the inductor coils by three phase variable frequency alternating current.

19. The method of claim 16, wherein the frequency of the rotating and oscillating electromagnetic field is set up for parametric resonance in the vibrational movement of the metal pieces.

20. The method of claim 13, wherein the metal pieces are transition metals.

21. The method of claim 20, wherein the metal pieces are iron.

22. The method of claim 13, wherein the metal pieces are Nano Iron or Zero Valent Iron powder.

23. The method of claim 13, wherein the chemically active compound is an oxidizing agent.

24. The method of claim 13, wherein the chemically active compound is a flocculant or coagulant.

25. The method of claim 24, wherein the flocculant consists of a cationic, an anionic, or nonionic polymer.

26. The method of claim 24, wherein the coagulant is a fine clay, hydrated lime, zeolite, alkali, or acid.

27. The method of claim 13, wherein the method further comprising applying a variable frequency drive, wherein a frequency varied from about 4 to about 60 Hz.

28. The system of claim 1, wherein the chemically active agent is an oxidizing agent, a flocculant, or a coagulant.

29. The system of claim 1, wherein the cylindrical housing is oriented horizontally.

30. The system of claim 6, wherein a second pair of inductor coils is positioned at a horizontal angle of about 120 degrees as compared to a first pair of inductor coils.

* * * * *